Dec. 3, 1968  J. P. PELMULDER  3,413,818
IMMERSION FREEZING
Filed Dec. 13, 1963  13 Sheets-Sheet 3

FIG-3

INVENTOR
JOHN P. PELMULDER

BY Hans G. Hoffmeister
ATTORNEY

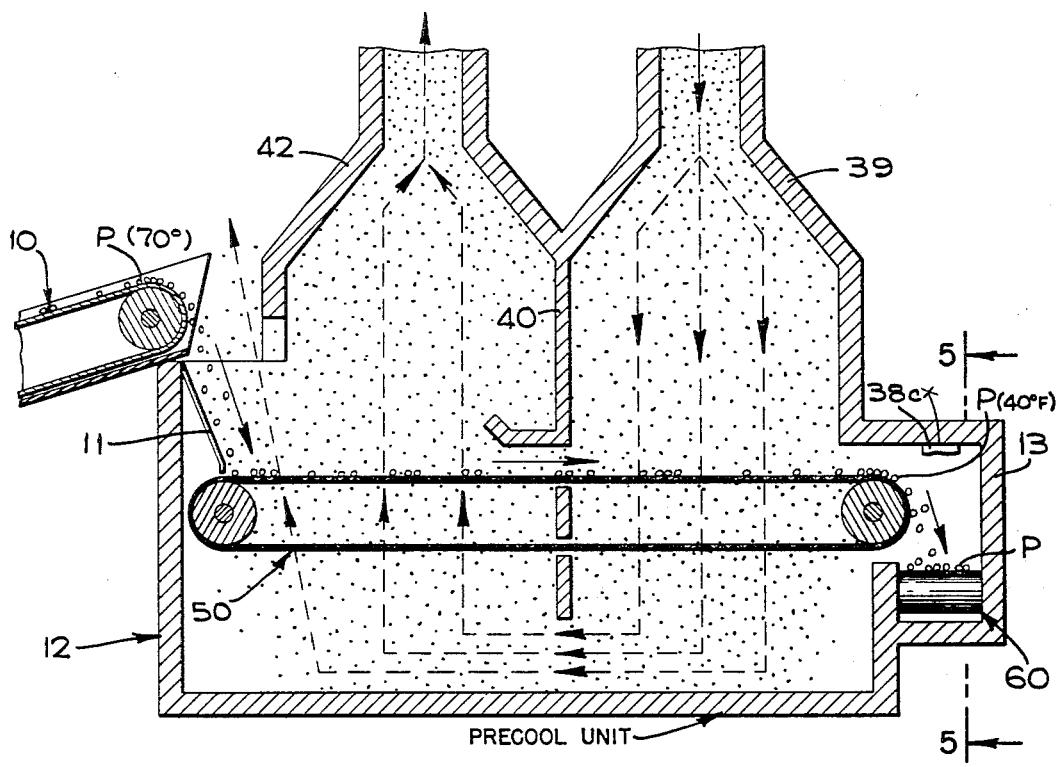
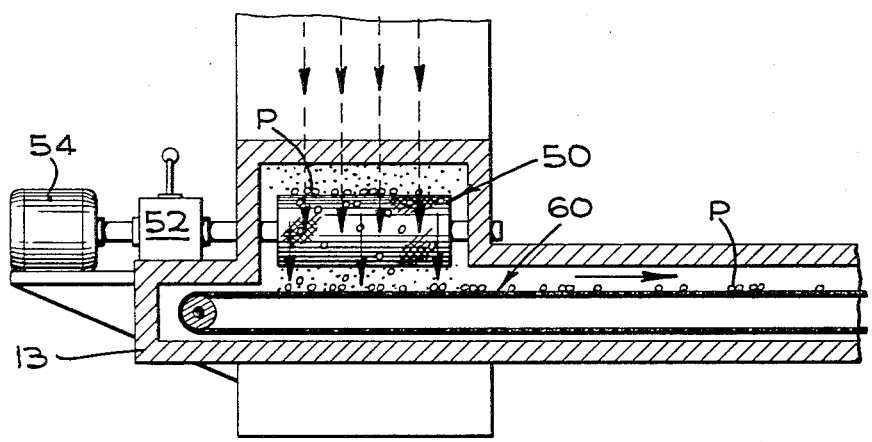

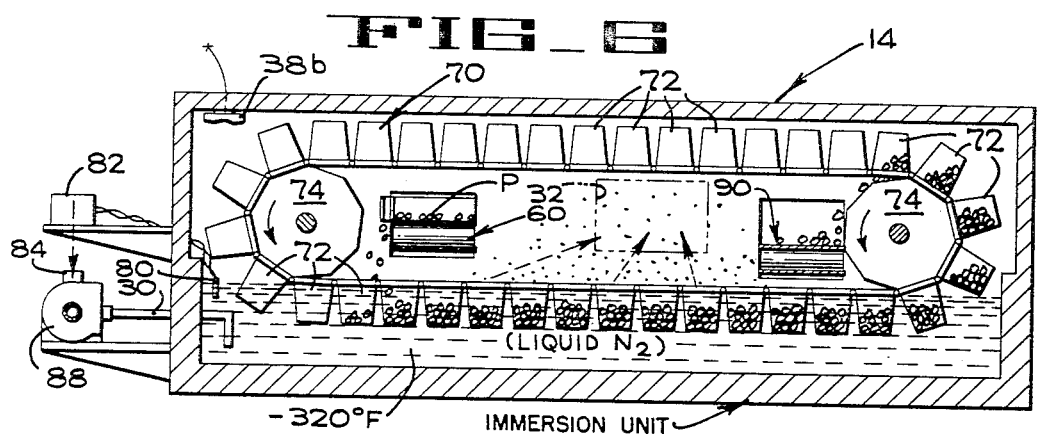
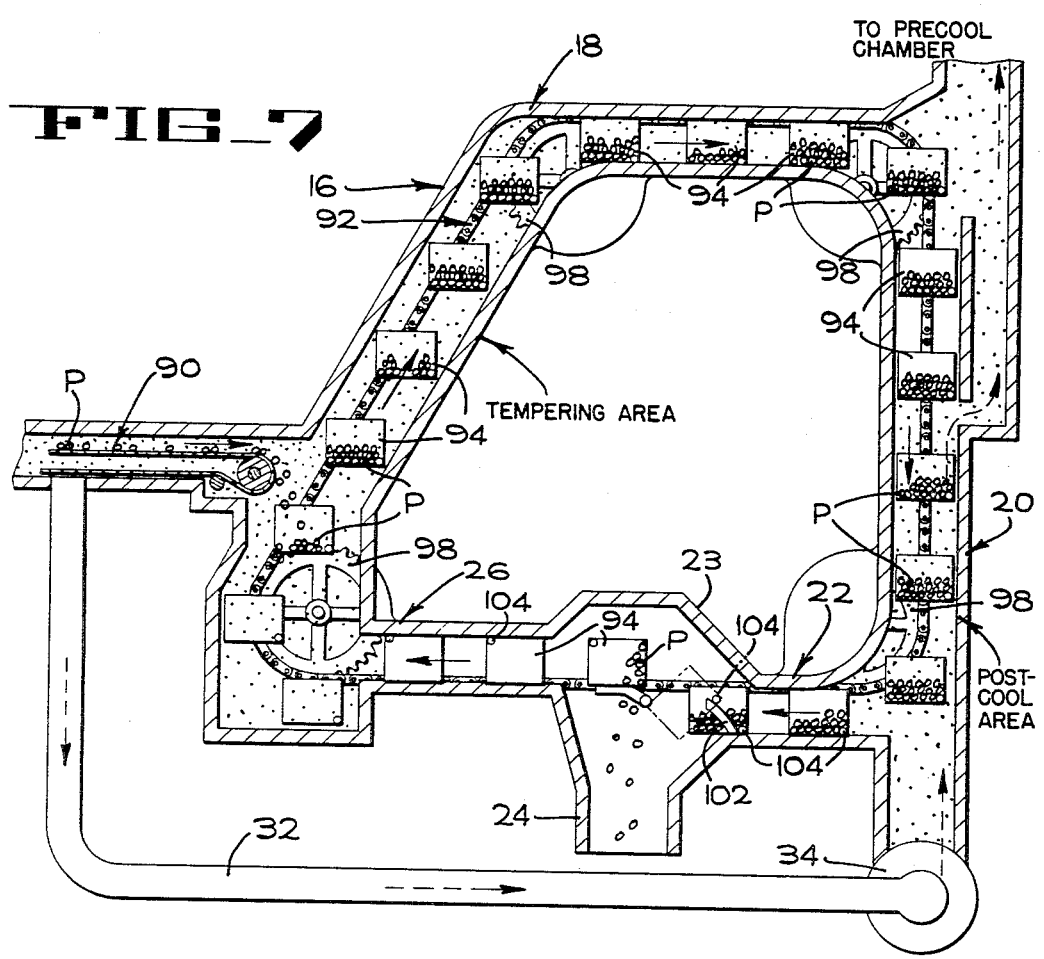

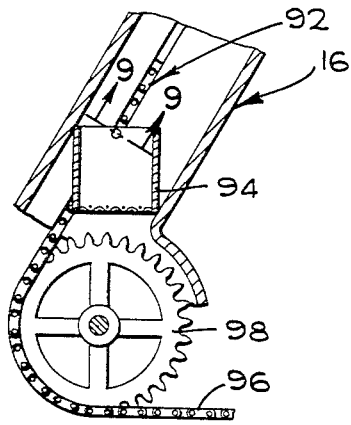
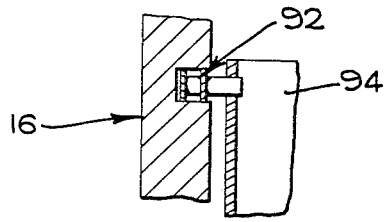
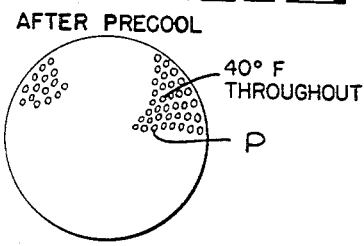
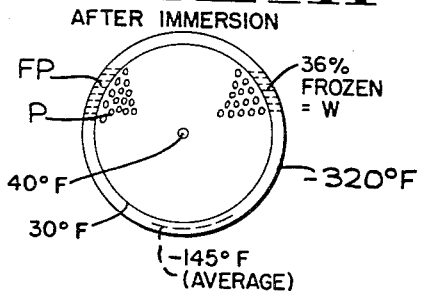
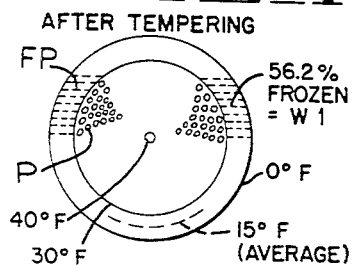
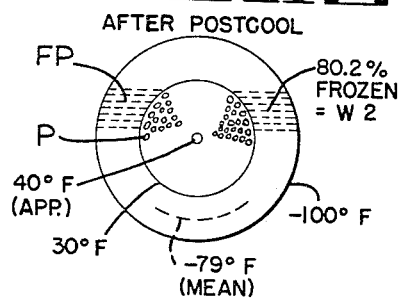
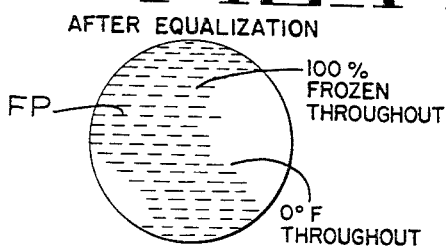

Dec. 3, 1968 J. P. PELMULDER 3,413,818
IMMERSION FREEZING
Filed Dec. 13, 1963 13 Sheets-Sheet 7

FIG_15

INVENTOR
JOHN P. PELMULDER
BY Hans G. Hoffmeister
ATTORNEY

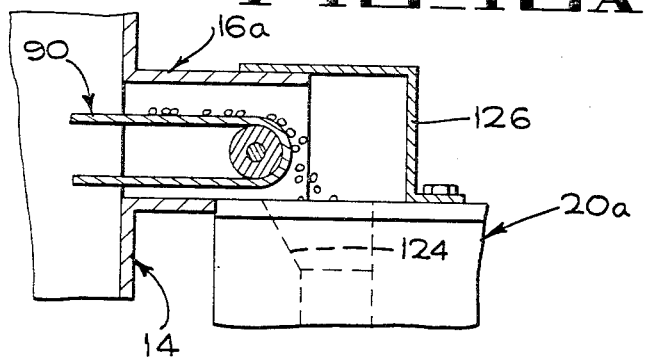
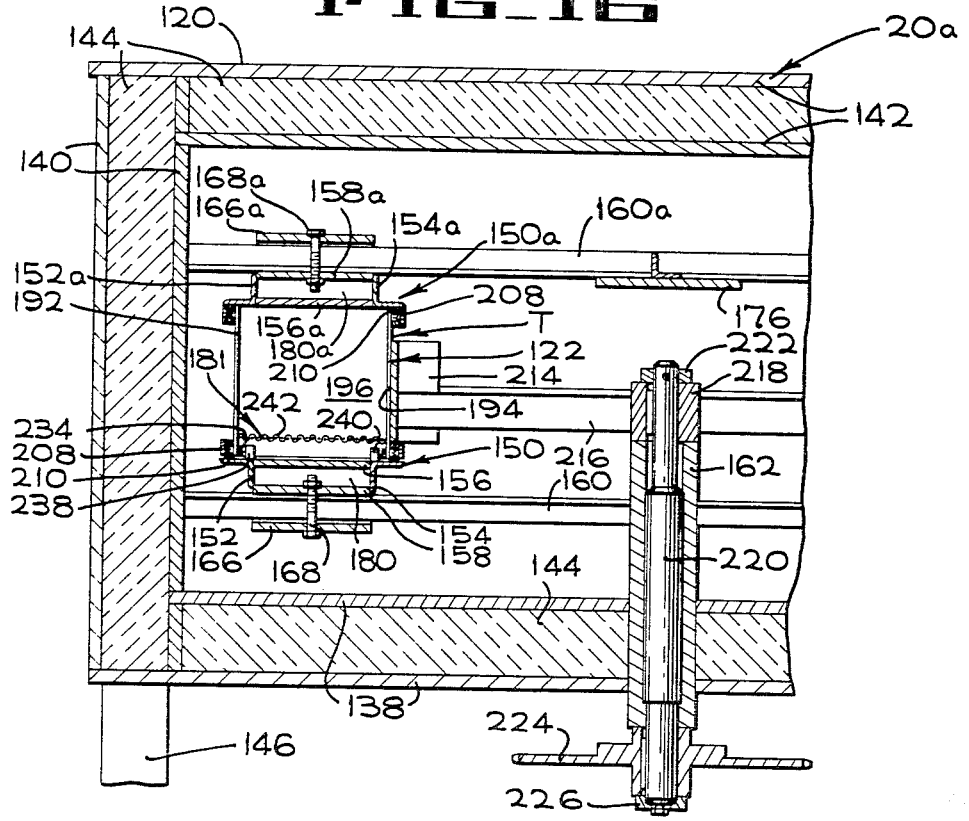

Dec. 3, 1968   J. P. PELMULDER   3,413,818
IMMERSION FREEZING
Filed Dec. 13, 1963   13 Sheets—Sheet 10
FIG_18
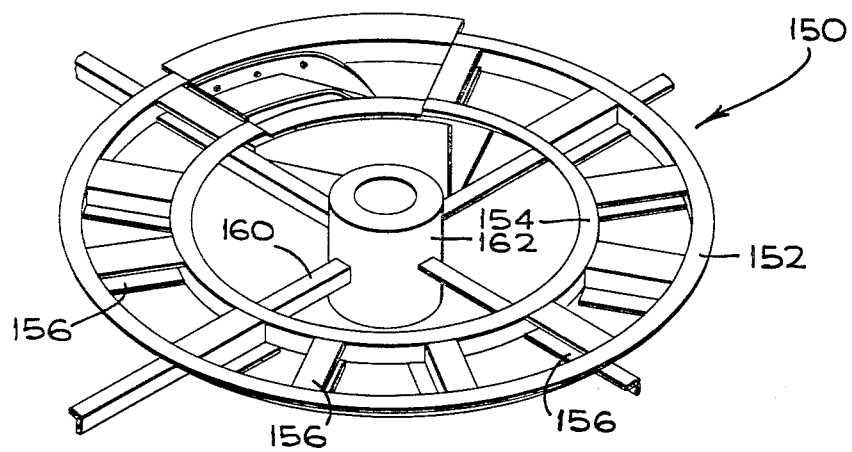
FIG_19
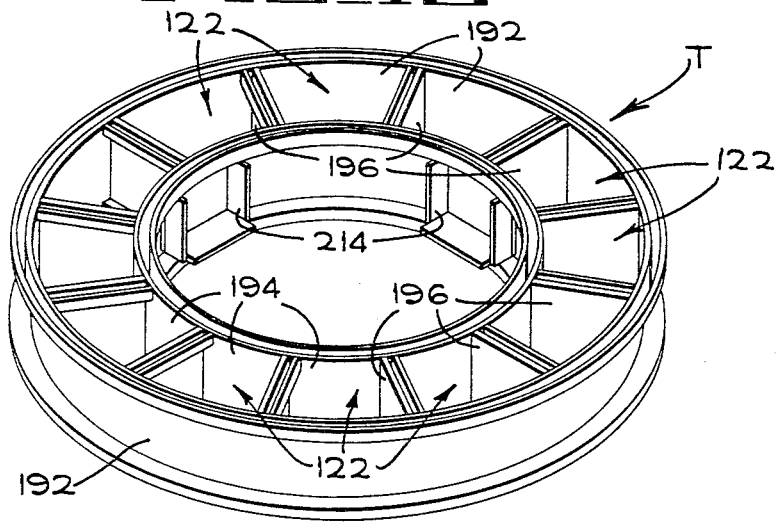
INVENTOR
JOHN P. PELMULDER
BY *Hans G. Hoffmeister*
ATTORNEY Dec. 3, 1968   J. P. PELMULDER   3,413,818
IMMERSION FREEZING
Filed Dec. 13, 1963   13 Sheets-Sheet 11
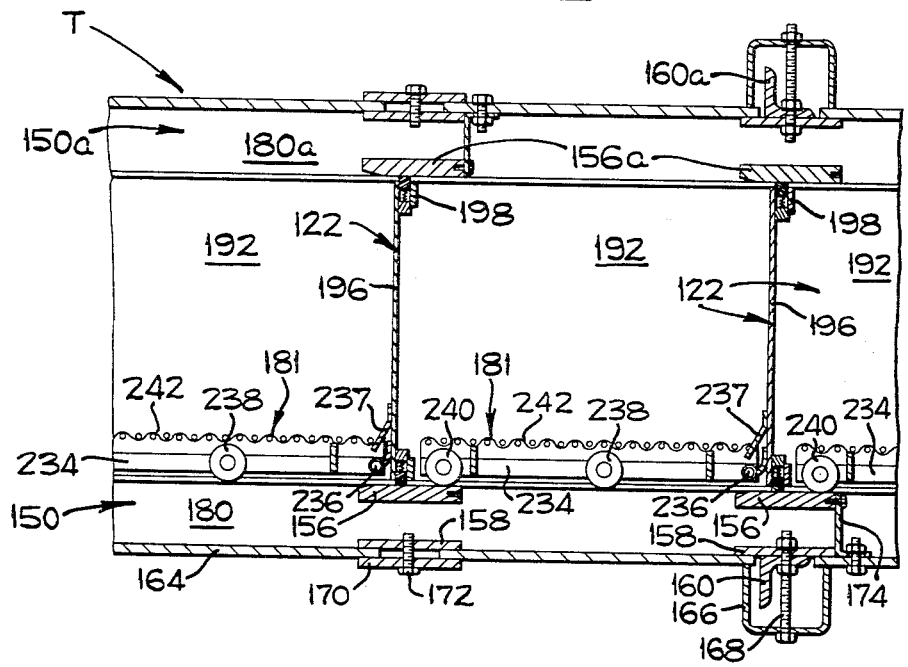
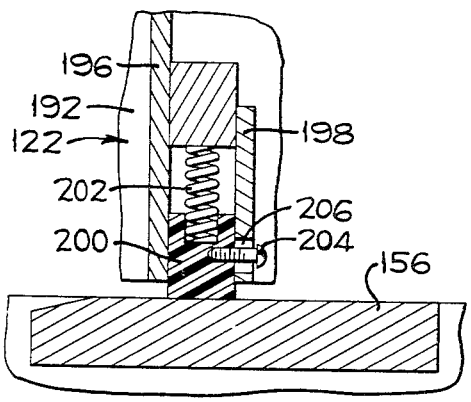
INVENTOR
JOHN P. PELMULDER
BY *Hans G. Hoffmeister*
ATTORNEY

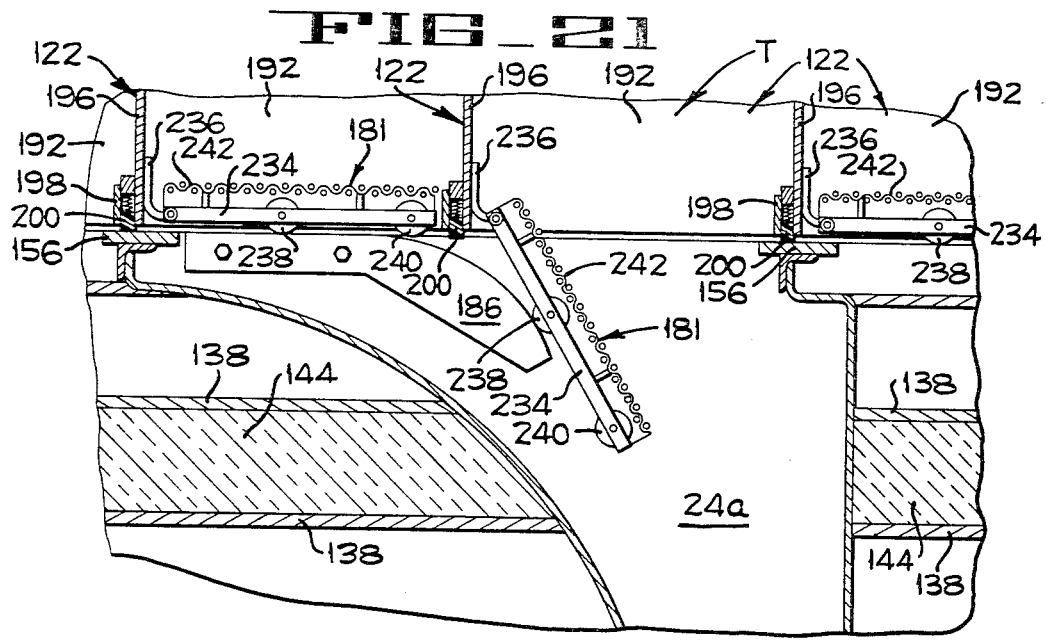
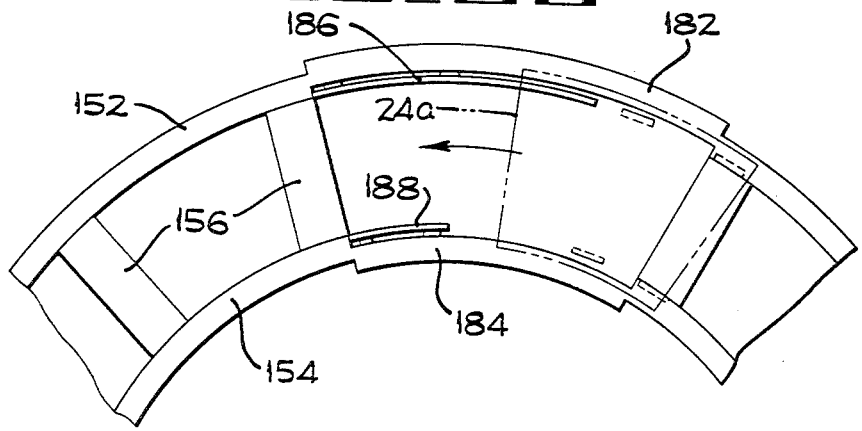

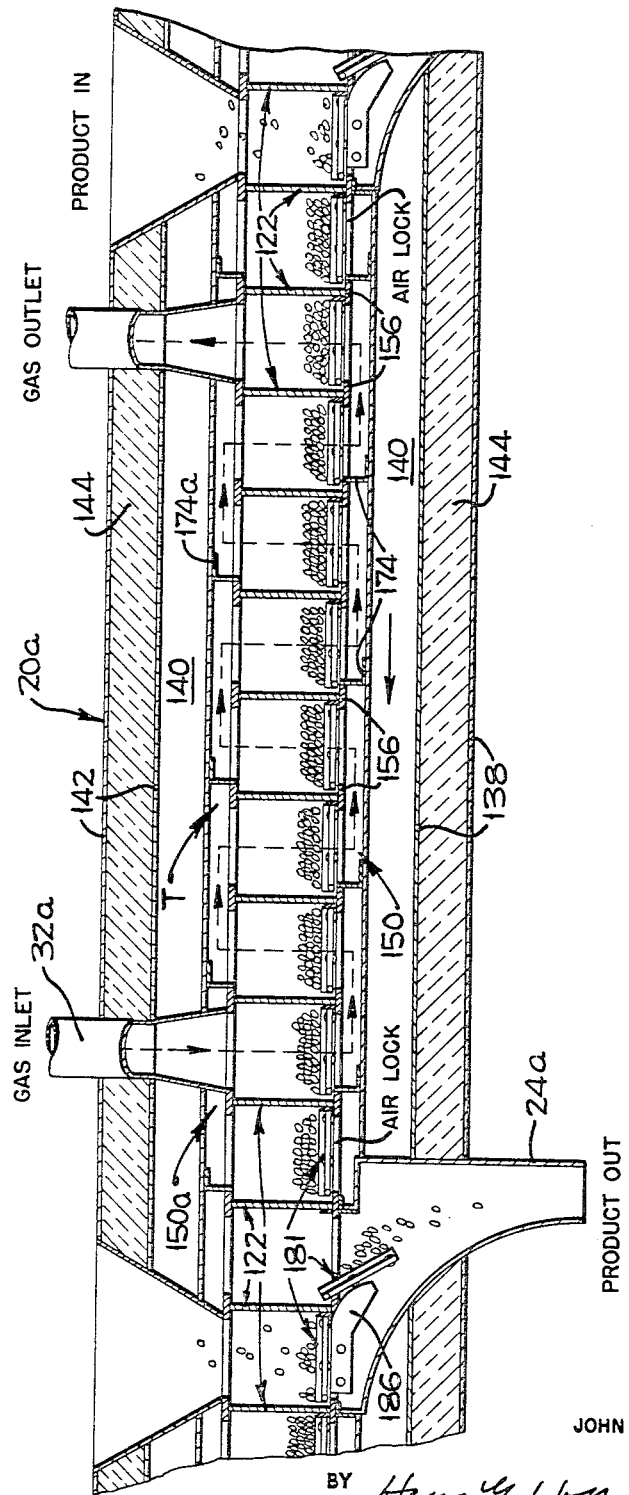

United States Patent Office 3,413,818
Patented Dec. 3, 1968

3,413,818
IMMERSION FREEZING
John P. Pelmulder, Saratoga, Calif., assignor to FMC Corporation, San Jose, Calif., a corporation of Delaware
Filed Dec. 13, 1963, Ser. No. 330,298
9 Claims. (Cl. 62—63)

This invention relates to refrigeration and more particularly to the quick freezing of delicate cellular products such as biologicals and food products. The apparatus and process of the present invention can be employed either to prepare the product for storage or for a subsequent freeze-drying operation.

With certain products of the type referred to, such as strawberries for example, freezing must be carried out rapidly by first immersing the strawberries in a cold liquid bath for quickly freezing a crust or shell on the exterior of the product. The product is removed from the bath and the freezing thereof is completed in a cold gas, so that the final product is frozen throughout after the temperature thereof has equalized.

It is an object of the present invention to provide a quick-freezing process of the type described which holds the thickness of the initially frozen shell or crust forming the outer layer of the product to a minimum.

Another object is to improve the efficiency, decrease the cost of operation, and minimize the consumption of the liquid which forms the freezing bath, such as liquid nitrogen or other cryogenic liquefied gases.

A further object is to provide optimum temperature gradients throughout the various steps of the freezing cycle.

It is also an object of the invention to minimize splitting and cracking of certain delicate products that are frozen in the process of the invention, such as strawberries or the like.

Another object of the invention is to exclude air from the system, with its attendant water vapor which might be frozen out into snow or ice crystals and upset long term operation of the system.

A further object of the present invention is to provide precise control of the various steps of the process including precool, immersion, tempering, and postcool effects.

A further object is to provide apparatus that can perform the freezing process continuously.

It is another object of the present invention to provide a combined tempering and postcool unit which operates continuously.

An object of a modified form of the invention is to provide the postcool unit of the rotary turntable type, which can be integrated into a continuous refrigeration system.

The manner in which these and other objects of the present invention may be accomplished will be apparent to those skilled in the art from the following detailed description of the invention and the accompanying drawings in which:

FIGURE 3 is a plan of the system with parts removed to show certain details of the system.

FIGURE 4 is a section taken on lines 4—4 of FIGURE 3, showing the precool unit.

FIGURE 5 is a section taken on lines 5—5 of FIGURE 4, showing a portion of the precool unit and a portion of a cross conveyor.

FIGURE 6 is a section taken on line 6—6 of FIGURE 3, showing the immersion unit.

FIGURE 7 is a vertical section through the combined tempering and postcool unit.

FIGURE 8 is a fragmentary vertical section through a portion of the tempering unit showing basket details.

FIGURE 9 is a fragmentary section taken on lines 9—9 of FIGURE 8 showing a detail of the basket mounting.

FIGURES 10 to 14 are diagrammatic sections of an idealized spherical product, showing its condition at various steps in the freezing cycle.

FIGURE 15 is a plan of a modified embodiment of the invention using a turntable-type postcooler.

FIGURE 15A is a fragmentary section taken on lines 15A—15A of FIGURE 15.

FIGURE 16 is a fragmentary vertical section of the postcool unit taken on lines 16—16 of FIGURE 15.

FIGURE 18 is a perspective of the lower stationary ring that mates with the turntable.

FIGURE 19 is a perspective of the turntable.

FIGURE 20 is a partial vertical circular section through the upper and lower ring and the turntable.

FIGURE 20A is a fragmentary enlarged section of the turntable seal.

FIGURE 21 is a fragmentary vertical section through the turntable and lower ring, taken at the discharge station.

FIGURE 22 is a fragmentary plan of the lower ring at the discharge chute station.

FIGURE 23 is a diagrammatic vertical developed circular section taken through the entire apparatus and showing the product and gas flow paths.

Figure 1:
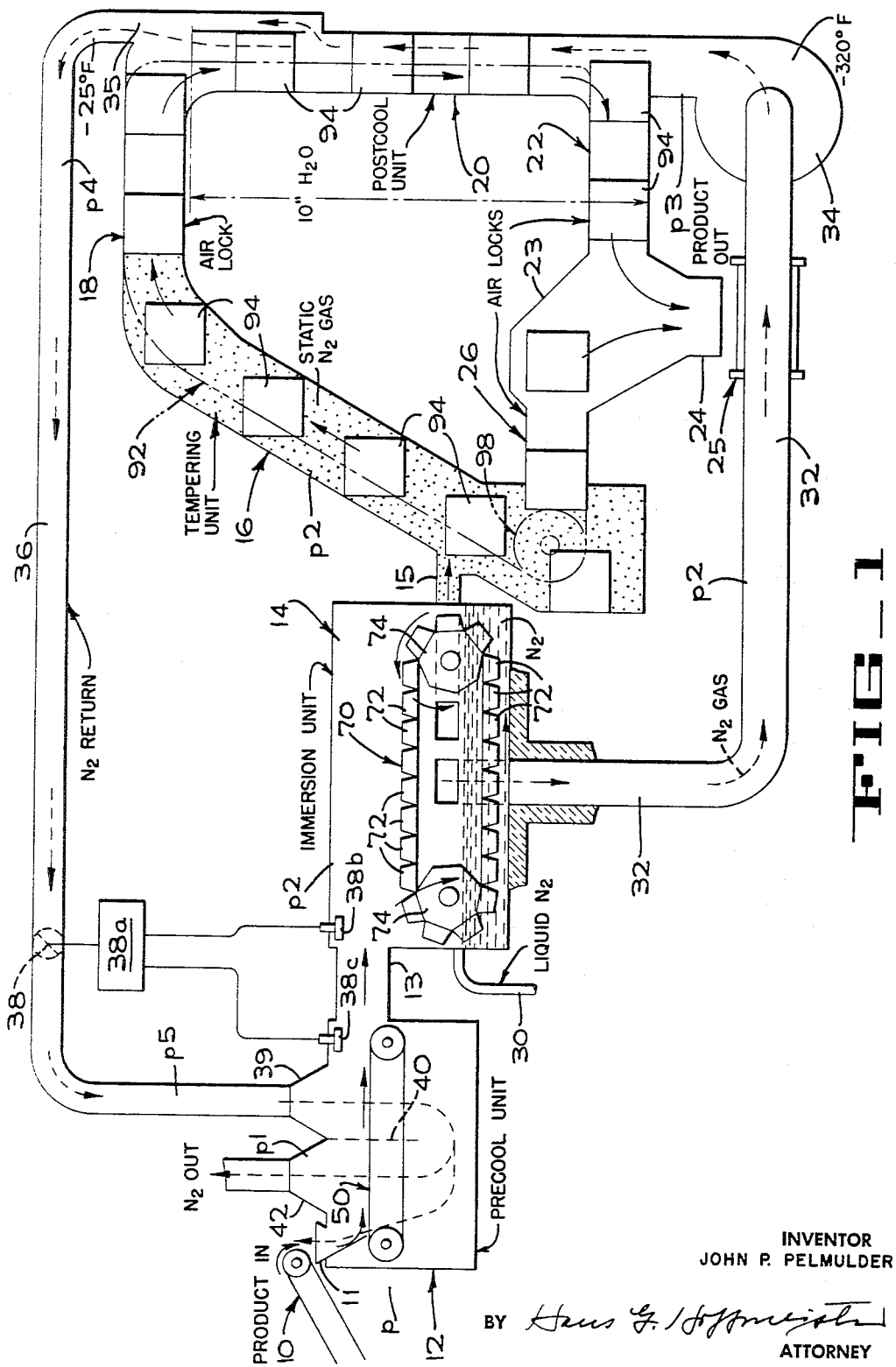
FIGURE 1 is a schematic of the system embodying the invention.
Figure 2:
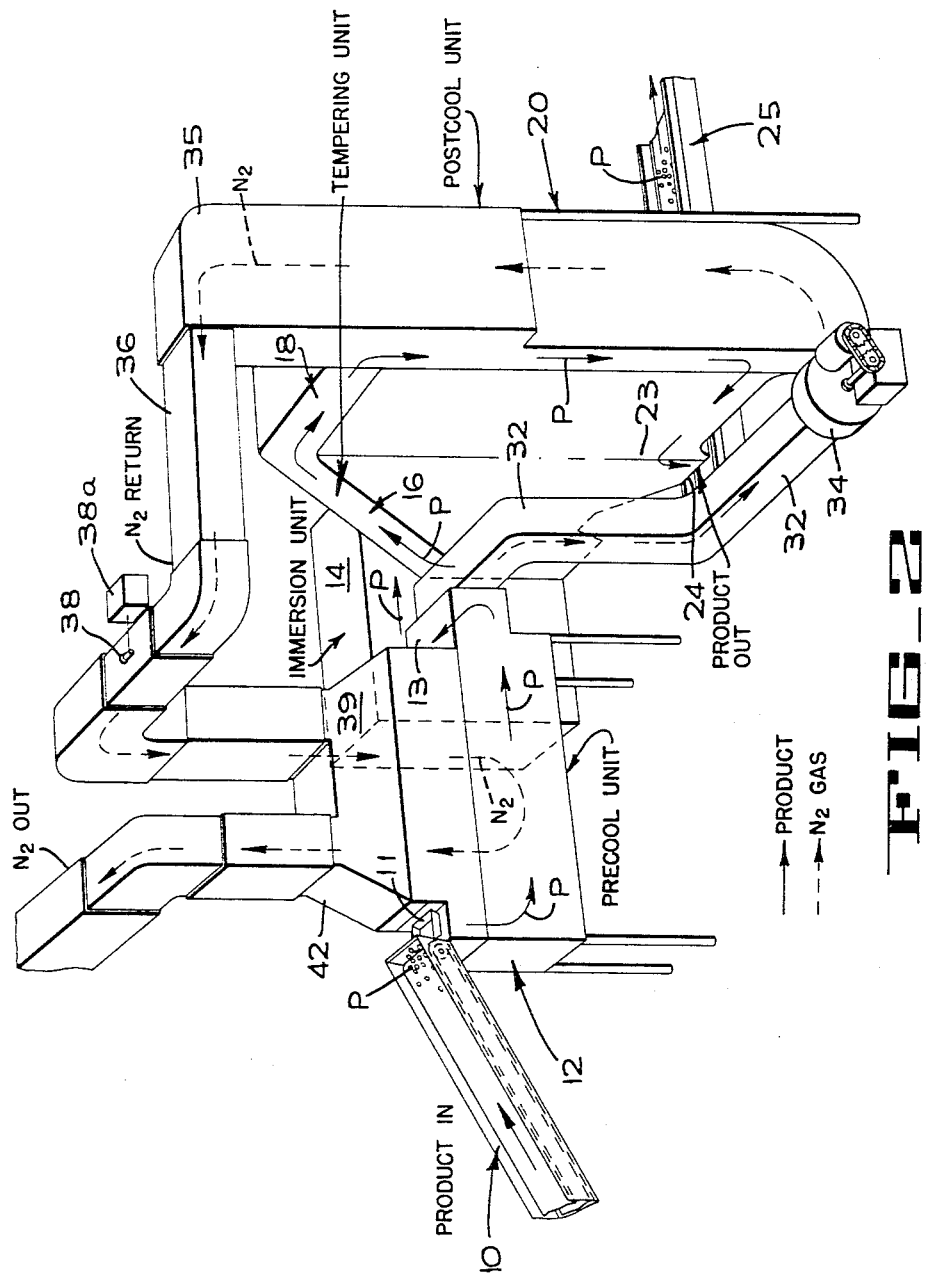
FIGURE 2 is a perspective of the system shown diagrammatically in FIGURE 1.
Figure 17:
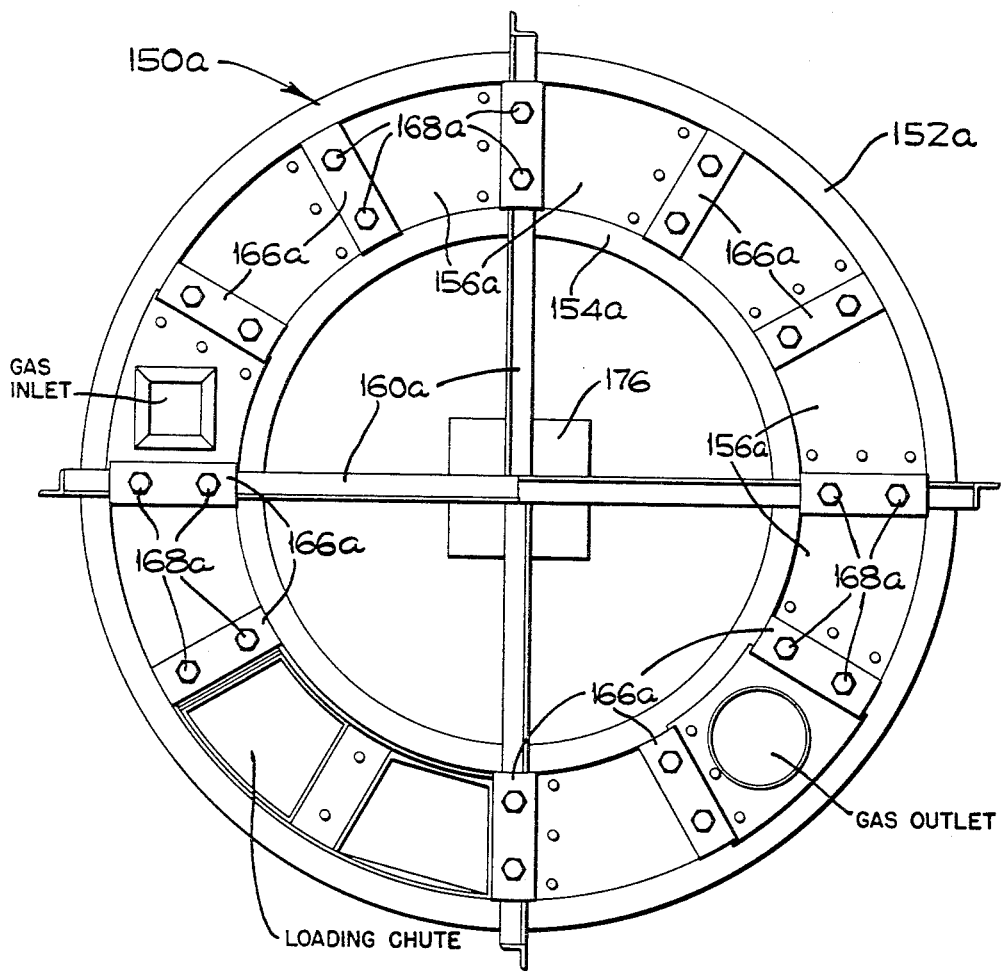
FIGURE 17 is a plan of the upper stationary ring that mates with the turntable.

The general arrangement of the apparatus, as illustrated in the diagram of FIGURE 1 and in the perspective of FIGURE 2 will first be described. Taking up the basic parts and units in the order of product flow, the product P is introduced into the system by means of a feed conveyor 10, the details of which form no part of the invention. The product drops from the delivery end of the feed conveyor 10 into an inlet chute 11 at the input end of a precool unit 12, in which unit the product is bathed in cold nitrogen gas. The product passes from the precool unit 12 through a transfer chamber 13 and into an immersion unit 14. Here the product is immersed in a bath of liquefied nitrogen gas $N_2$, which is at a temperature of −320° F. The product leaves the immersion unit 14 and passes through a transfer chamber 15 (by a cross conveyor to be described) to a tempering unit 16. Here the product is transported through a static body of cold nitrogen gas for tempering, after which it passes through an airlock 18 and enters the postcool unit 20. In the postcool unit the product is carried counterflow to a dynamic or flowing stream of cold nitrogen gas. Freezing of the product is completed in the postcool unit 20, after which the product passes through a second airlock 22 and into a discharge unit 23. Here the product is released and discharged through the discharge chute 24 into a take-away conveyor 25. An air lock 26 is disposed between the discharge unit 23 and the tempering unit 16.

The path of the nitrogen employed as a freezing tempering and postcooling agent in the process of the present invention will now be traced. Liquid nitrogen is admitted at line 30 to the immersion unit 14 (FIG. 1) forming a bath of liquid nitrogen in the immersion unit. When the product P is immersed in the bath of liquid nitrogen to freeze the shell or crust thereof, liquid nitrogen is evaporated and the cold gas thereby evolved enters a delivery duct 32 which leads to a blower 34. The blower 34 directs the cold nitrogen gas through a gas inlet at the bottom of the postcool unit 20. The gas entering the postcool unit is at approximately −320° F. This gas flows upwardly through the downwardly moving product in the postcool unit, and leaves by way of a nitrogen gas outlet 35, the temperature of the gas at this area being approximately −25° F. The gas is thereby conducted in a nitrogen gas return line 36 through the precool unit 12.

The pressures in the various units are adjusted by a damper 38 in the return line 36, which is operated by a remote control unit 38a controlled by a pressure-responsive device 38b in the immersion unit and a pressure-responsive device 38c in the precool unit. The purpose of the damper 38 is to equalize the pressure within the precool and immersion units so that there is little or no transfer of nitrogen gas between the immersion unit 14 through the transfer chamber 13 and the precool unit 12. Devices 38a and 38b could also be thermostats for controlling the damper 38. If the temperature at the precool unit approaches that in the immersion too closely, pressure in the precool unit is too low, and damper 38 would be opened.

The returning nitrogen gas in line 36 is directed by the damper 38 to the nitrogen gas inlet duct 39, whereupon the gas enters the precool unit 12 and passes downwardly through the product P being conveyed through the precool unit. A baffle 40 within the precool unit forces the gas downwardly through the product, after which the gas reverses direction and passes through the product a second time, the gas now moving upwardly, and out of the nitrogen outlet 42. Some of the nitrogen flows out through the inlet chute 11 that receives the product initially. The rate of egress of nitrogen gas out of the inlet chute 11 exceeds the diffusion rate of air through the gas, so that air cannot enter the system through the inlet chute. The same conditions are maintained as to nitrogen flow through the nitrogen outlet duct 42.

A detailed description of the various parts and units of the system of the embodiment of the invention now being described follows.

The product P entering the precool unit by means of conveyor 10 will be at room temperature, or approximately at 70° F. throughout. The product drops, as seen in FIGURE 4, through the inlet chute 11 onto a wire mesh conveyor 50 which transports the product through the precool unit 12. The mesh belt 50 in the precool unit 12 is driven by variable speed transmission 52 and an electric motor 54. The details of the transmission 52 are not important to the invention, it only being necessary that the speed of the precool belt 50 be adjustable in order to make possible selection of the proper precool time. In the precool unit the product temperature is brought down from the assumed initial temperature of 70° F. to a uniform temperature of 40° F. throughout. An idealized one-inch sphere of the product, which might represent strawberries, for example, after it leaves precool unit 12 appears in the diagram of FIGURE 10.

As seen in FIGURES 4 and 5, the product P drops off the delivery end of the wire mesh conveyor 50 of the precool unit onto the cross conveyor 60. The conveyer 60 carries the product (which as mentioned is now at 40° F.), into the immersion unit 14. The cross conveyor 60 is, as seen in FIGURE 3, driven by variable-speed transmission 62 and a motor 64. As also seen in FIGURE 3, one or more plows 66 are mounted in a fixed position above the cross conveyor 60 to divert the product P from the cross conveyor into the immersion unit 14.

The immersion unit 14, which contains the bath of liquid nitrogen as previously described, contains a conveyor 70 which is made up of a series of articulated baskets or buckets formed of a wire mesh material, linked together or connected together by means of a chain, such details not being critical to the invention. Each of the baskets 72 is, as seen in FIGURE 6, traversed through the bath of liquid nitrogen and then carried out of the bath, whereupon it returns across the upper portion of the immersion unit 14. The baskets pass over end drums or sprockets 74, one of which is driven by variable speed transmission 76 and a motor 78. This construction permits independent adjustment of the immersion time of the product within the immersion unit, relative to the process times for other steps carried out during the cycle. The level of liquid nitrogen $N_2$ within the immersion unit 14 is maintained constant by a sensor or level control unit 80, which has liquid and no liquid sensing elements, and which are connected to a control device 82. The control device 82 controls a controller 84 for a motor 86 (FIG. 3) that drives a nitrogen pump 88, and directs liquid nitrogen from a source (not shown) to the nitrogen inlet line 30 previously described, and hence into the bath of liquid nitrogen within the immersion unit 14. The control device 82 could also actuate a solenoid valve from a pressurized storage tank.

When the product is first dropped into the bath over a basket 72 of the immersion unit, it is agitated by the violent evaporation or bubbling action of the liquid nitrogen as the relatively warm product strikes the cold liquid. However, the product is heavier than the liquid, so that before the conveyor baskets 72 have passed very far beyond the cross conveyor 60 the product, such as strawberries, will have settled into the baskets, and although they may be jiggled around somewhat by the evolving nitrogen gas, they will be carried through the bath in the baskets 72.

As the baskets 72 are carried up around the delivery roller 74 of the immersion unit 14, the baskets are inverted and, as seen in FIGURE 6, the product elements are dumped and fall by gravity onto a cross outlet conveyor 90. The products fall by gravity out of the inverted baskets 72 on the upper reach of the conveyor 70. The entire upper reach of baskets 72 of the conveyor 70 has been broken away in the plan of FIGURE 3 for clarity. During the immersion process, a shell or crust is frozen so as to form the outer layer of the product, as illustrated in FIGURE 11. The surface of this crust is at −320° F. and the inner boundary is at 30° F., as also illustrated in FIGURE 11. The center of the product will be at the precool temperature of 40° F. In a typical example to be described presently, the frozen crust or shell FP provided in the imersion unit represents approximately 36% by weight of the product, which weight is indicated by the symbol $w$.

The cross conveyor 90 is driven by a variable-speed drive unit 91, driven by a motor 93 and carries the partially frozen product in the condition illustrated diagrammatically in FIGURE 11 from the immersion unit 14 through the transfer device 15, which includes the cross conveyor 90 just referred to, and into the tempering unit 16.

The tempering unit 16 forms part of a composite treatment system which includes an air lock 18, the postcool unit 20, an airlock 22, a discharge unit 23, a discharge chute 24 and a third airlock 26. Running through these units is a bucket conveyor 92 having a series of individual buckets 94 linked thereto. The buckets 94 are pivotally mounted between a pair of chains 96 which pass over chain wheels 98. One of the chain wheels 98 is a driven wheel and, as seen in FIGURE 3, is driven by a variable-speed drive unit 100, driven by a motor 101. The speed of the bucket conveyor 92 can thus be adjusted, which determines the tempering time and which, in conjunction with the rate of delivery of nitrogen gas through the postcool unit 20 by the blower 34, determines the postcool effect.

The product falls from the cross conveyor 90 into the ascending buckets 94 and is immediately carried upward through the tempering unit 16. When the buckets emerge from the tempering unit 16 and enter the upper airlock 18, in the example being discussed the condition of the product is that illustrated diagrammatically in FIGURE 12. The surface of the product is at 0° F. and that 56.2% of the product is frozen, representing a weight of frozen product equal to $w1$. The temperature of the surface of the product has been raised from −320° F., which was the condition under which the product was admitted to the tempering unit, to 0° F., when the product leaves the tempering unit.

The gas in the postcool need not be at the very low temperature of −320° F. throughout the postcool process. This is because the tempering process, by raising the external temperature of the product to 0° F., permits the use of a higher temperature postcool gas at the outset of the postcool operation, which in turn makes possible the use of a counter-current flow type of heat exchange process in the postcool unit 20. Since the tempered product entering the postcool unit has a surface temperature of 0° F., this provides effective heat transfer even though the temperature of the warm nitrogen gas leaving the postcool unit is at −25° F. Thus the tempering step provides an effective temperature difference between the product and the gas in the postcool unit, even though the counterflow principle of heat exchange is employed. This optimizes the use of nitrogen gas evolved during immersion, for the postcool or final freezing operation.

When the product leaves the postcool unit 20 it is 80.2% frozen, representing a weight of the frozen product FP indicated at w2, which is sufficient to complete freezing of the product throughout, during the equalization process that will follow when the product is discharged from the postcool unit. As indicated in FIGURE 13, after postcool, the surface temperature of the product is −100° F. and the temperature of the inner boundary of the frozen crust is 30° F. The partially frozen product is then transported through the airlock 22 into the discharge unit 23 where each basket of the conveyor is successively inverted to empty the product and dump it through the discharge chute 24 onto the take-away conveyor 25. A device for inverting the baskets for discharge includes a cam 102 that is engaged by a roller 104 on each basket.

After the product has been discharged from the postcool unit 20 it is placed in the static atmosphere, which may be at freezing temperature or lower, and when the temperature equalizes, the product will be 100% frozen throughout. The product will consist entirely of frozen material indicated at FP, the temperature of which is 0° F. throughout. This result is obtained with a minimum use of evolved nitrogen gas, which use is minimized both by judicious selection of immersion time, and operation of the tempering and postcool units. Just the right amount of heat is abstracted in each of the processes (although the tempering process is assumed to effect little or no heat exchange), to optimize efficiency in terms of use of the freezing material, namely liquid nitrogen.

The sequence of pressures from atmospheric pressure $p$ through pressure $p5$ in the system is designated in FIGURE 1. The pressures in ascending order are as follows:

$p$—atmospheric.
$p1$—exit precool unit; slightly above atmospheric.
$p2$—immersion unit; slightly above $p1$.
$p5$—entrance precool unit; same as $p2$.
$p3$—entrance precool unit; above $p2$ due to blower 34.
$p4$—exit postcool unit; approximately 10 inches of water below $p3$ and slightly above $p5$.

The resistance of the product in the postcool unit 20 causes pressure drop across the unit of approximately 10 inches of water, although this value is not critical. It is determined by the nature of the product and by the capacity of blower 34. As previously mentioned, the damper 38 is automatically adjusted in accordance with pressure sensers 38b and 38c to maintain the pressures $p2$ in the immersion unit and $p5$ at the entrance to the precool unit, substantially equal. There will be a small pressure drop across the damper 38, and therefore the pressure $p4$ at the inlet side of the damper is slightly above the pressure $p5$ at the outlet side thereof.

EXAMPLE OF A NITROGEN IMMERSION FREEZING PROCESS

In order to explain the contribution of each step in a complete freezing process that embodies the invention, a typical heat balance working of the process will be explained, by way of example only. The following physical data, starting conditions, and process parameters are assumed.

Product 1″ diameter spheres of food (i.e.: strawberries, etc.) total 1 lb. in weight.
Specific heat, unfrozen, 0.92 B.t.u./lb. ° F.
Specific heat, frozen, 0.47 B.t.u./lb. ° F.
Thermal conductivity, frozen, 1.3 B.t.u./hr. ft.$^2$ ° F./ft.
$T_0$=Starting temperature product 70° F.
$T_1$=Temperature product after precooling, 40° F. (FIG. 10).
$T_2$=Freezing temperature product, 30° F.
$T_p$=Final temperature product throughout, 0° F.
Latent heat fusion (freezing) of product, Q=129 B.t.u./lb.
Cryogenic liquid, $N_2$ at −320° F.=$T_3$.
Weight $N_2$ used, 1 lb. $N_2$/lb. product.
Heat of vaporization of one lb. $N_2$, QN=85.7 B.t.u.
Temperature of $N_2$ gas leaving postcool unit, T7=−25° F.

*Heat to be removed by immersion.*—As previously explained, before immersion the product is precooled to a uniform temperature of 40° F. (FIG. 10). The heat to be removed during immersion will now be calculated. Calculations of this type are open ended and require the making and testing of a series of interdependent assumptions to attain an eventual heat balance. Here the ultimate assumption works out to be that 59.3% of the latent heat of fusion of the product is removed by the immersion step. Actually, only a crust is frozen by immersion, but to a low temperature.

$q$=heat above freezing, i.e., the heat required theoretically to bring the temperature of the entire product from its precool temperature of 40° F. to its freezing temperature of 30° F. This figure is merely used for calculation purposes.
$q$=1 lb. × 0.92 B.t.u./lb. ° F. (40° F.−30° F.).
(1) $q$=9.2 B.t.u./lb.
$q_1$=heat below freezing, i.e., the heat required to remove the aforesaid 59.3% of the latent heat of fusion.

$$q_1 = \frac{59.3\%}{100} \times 129 \text{ B.t.u./lb.}$$

(2) $q_1$=76.5 B.t.u./lb.
$q_4$=total heat removed=$q_1+q_2$.
(3) $q_4$=9.2+76.5=85.7 B.t.u./lb.

Actually, only a crust of a certain thickness (thickness determined from assumption) is frozen during immersion. The outer surface of the crust is at −320° F., and the inner boundary of the crust is at freezing temperature, 30° F.

$T_4$=average temperature of frozen crust.

(4) $$T_4 = \frac{-320° \text{ F.} + 30° \text{ F.}}{2} = -145° \text{ F.}$$

$w$=lb. crust actually frozen (to be found).
$q_4$=the "heat capacity" of the crust frozen during immersion, *below* the freezing temperature.
$q_4$=$w$×0.47/B.t.u./lb. ° F.×[+30° F.−−145° F.].
(5) $q_4$=82.2 $w$.
$q_5$=latent heat of fusion of the crust of weight $w$=129 $w$. B.t.u./lb. where 129 B.t.u./lb. is the latent heat of fusion of the product (given).
$q_6$=total heat removed in freezing $w$ lbs. of the crust.
(6) $q_6=q_4+q_5$=82.2 $w$+129 $w$=76.5 B.t.u./lb., 211.2 $w$ B.t.u./lb.=76.5 B.t.u./lb. Solving (6) for $w$:

(7) $$w = \frac{76.5}{211.2} = 0.362$$

Thus 36% of the product is frozen into a crust by immersion. The inner boundary of the crust is just at freezing, 30° F., and its outer boundary is at −320° F., as shown in FIG. 11.

Tempering (heat transfer assumed to be negligible from the product to the static tempering gas).

The product is tempered after immersion to bring its surface to 0° F. (FIG. 12). The inner boundary of the crust at 30° F. will move radially inwardly, FIG. 12, and the frozen crust now will have a weight $w_1$.

$T_5$=average temperature of the crust after tempering.

(8) $$T_5 = \frac{0°\,F. + 30°\,F.}{2} = 15°\,F. \text{ (Fig. 12)}$$

$q_7$=the "heat capacity below freezing" of the crust of weight $w1$.

$q_7 = w_1 \times 0.47$ B.t.u./lb.$\times 15°$ F.

(9) $q_7 = 7.05\,w_1$

(10) $q_8$=latent heat of the crust of weight $w_1 = 129\,w_1$ B.t.u./lb., where 129 B.t.u./lb. is the latent heat of fusion of the product (given).

$q_7$ and $q_8$ must equal $q_6$, the total heat removed in freezing the first crust $w$ by the immersion freezing step. $q_6 = 76.5$ B.t.u./lb. (6).

(11) $7.05\,w_1 + 129\,w_1 = 76.5$; $136\,w_1 = 76.5$. Solving (11) for $w_1$,

(12) $$w_1 = \frac{76.5}{136} = .056$$

Thus 56.2% of the product is frozen after tempering, into a crust. The inner boundary of the crust is just at freezing, 30° F. and its outer boundary is at 0° F., as shown in FIG. 12.

POSTCOOLING

The purpose of the postcooling step is to further deepen the crust of the product as received from the tempering step, the crust to be deepened sufficiently so that upon removal of the product its temperature will equalize at 0° F.

In order to bring the final average temperature of the product to the desired temperature of 0° F., the heat $q_9$ that must have been removed during the entire process after precooling to 40° F. is the sum of the following:

(1) $q$, 40° F. to 30° F.$=1 \times 0.92 \times (40-30) = 9.2$ B.t.u./lb.

Q, latent heat of fusion (given)$=129$ B.t.u./lb.

$q_{10}$, 30° to final 0° F. temperature$=1 \times 0.47 \times (30-0)$.

$q_{10} = 14.1$ B.t.u./lb.

$q_9 = q + Q + q_{10} = 9.2 + 129 + 14.1$.

(13) $q_9 = 152.3$ B.t.u./lb., total heat to be removed to bring product from 40° F. ($T_1$) to 0° F. ($T_p$) throughout.

During immersion (it being assumed that one pound of nitrogen was evaporated per pound of product), 85.7 B.t.u. (QN) had been removed from the product in the immersion unit.

As indicated in Equation 12 above, 56.2% of the product was frozen after tempering and before postcooling, this represented the removal of 85.7 B.t.u. (QN).

Thus the additional heat to be removed during postcooling $q_{11}$ is as follows:

$q_{11} = 152.3$ B.t.u. ($q_8$, 13) $-83.7$ B.t.u. (QN).

(14) $q_{11} = 66.6$ B.t.u., to be removed by postcooling.

During the postcool step a product surface temperature of $-100°$ F. is readily attainable starting with $N_2$ gas at $-300°$ F. The temperature of the inner boundary of the frozen crust after postcool is 30° F. ($T_2$), and the average of mean temperature $T_6$ of the frozen crust (which will occur nearer the outer than the inner boundary of the frozen crust) will be $-79°$ F., FIG. 13.

The required weight percentage $w_2$ of frozen product in the crust necessary to cool the entire product down to 0° F. after equalization, can be calculated as follows:

$w_1$, percentage frozen before postcooling$=56.2\%$ (12)

$q_{11}$, B.t.u. removed$=66.6$ B.t.u. (14)

$T_5$, average temperature of crust before postcooling$=15°$ F. (8) (FIG. 12)

$T_6$, average temperature of crust after postcooling$=-79°$ F. (15)

Q, latent heat fusion product (given)$=129$ B.t.u./lb.

$q_{11} = w_2\,w\,0.47\,[15-(79)] + (w_2 - .562)\,129$ $q_{11} = 44.2\,w_2 + 129\,w_2 - 72.5 = 66.6$. Solving for $w_2$

(15) $$w_2 = \frac{139.1}{173.2} = 0.802$$

Thus 80.2% of the sphere is frozen after postcool (FIG. 13).

POSTCOOL TIME

The heat to be removed during postcooling must flow from the interior of the sphere to the surface, and then must be transferred from the surface to the dynamic stream of gas. These two heat flow rates must be equal, so that either can be the basis for calculation of the postcool time. The transfer from the sphere surface to the gas will be used for the calculation. The time required depends upon the temperature difference, and the heat transfer coefficient between the product and the stream of gas.

The proper temperature difference to be employed in the calculation is the log mean temperature difference, or LMTD.

$$LMTD = \frac{T_8 - T_9}{\ln \frac{T_8}{T_9}}$$

where:

$T_8$=the entering product temperature—the leaving gas temperature.

$T_8 = 0°$ F. (FIG. 12)$-(-25°$ F.$)=25°$ F.; and $T_9$=the leaving product temperature—the entering gas temperature.

$T_9 = -100°$ F. (FIG. 13)$-(-32)°$ F.$=220°$ F.

(16) $$LMTD = \frac{220 - 25}{\ln \frac{-220}{25}} = 90°\,F.$$

As to the mean heat transfer coefficient $hm$, this depends upon the mass velocity of the dynamic stream of gas, and upon the nature of the product, which is assumed to be a mass of packed spheres. As seen in FIG. 1, a head of about 10" of $H_2O$ is maintained across the postcool unit, and at the mass flow rates corresponding to the coefficient $hm$ is about 20 B.t.u./hr. ft.$^2$ ° F.

Where $q_{12}=$ the rate of heat transfer from the surface of each product sphere to the gas stream, and with the frozen spheres having a surface area A of 1.31 sq. ft./lb.

$q_{12} = hm \times A \times LMTD$ (17)

$q_{12} = 20 \times 1.31 \times 90 = 2358$ B.t.u./lb. hr.

(17) $q_{12} = 39.3$ B.t.u./lb. min.

As seen in Equation 14 the total heat to be removed in the postcool unit is $q_{11} = 66.6$. Thus the postcool time $T_{10}$ is as follows:

(18) $$T_{10} = \frac{66.6\,(14)}{39.3\,(18)} = 1.7 \text{ minutes}$$

This result is not precise, because some of the factors which entered into its calculation are not capable of precise determination. However, the product can be sampled and the rate of the product motion through the postcool unit adjusted to produce the desired final results.

A similar calculation cannot be run through to determine the immersion time, because this depends upon a number of physical characteristics of the product which vary widely from product to product. Thus, immersion time is best determined experimentally and in the example given here, which closely fits the case of strawberries, the immersion time to produce the results of FIG. 11 would be in the order of 20 seconds.

FIGURES 15 to 23 illustrate a modified embodiment of the invention where the postcool unit is in the form of a rotary turret or turntable device, and in the form illustrated it is indexed from station to station instead of operating continuously as in the form previously described.

FIGURE 15 is a plan of a system incorporating the modified postcool unit, which unit is indicated generally at 20a. The precool and immersion units 12 and 14 are like those in the embodiment of the invention previously described, and the description thereof need not be repeated. The tempering unit indicated at 16a differs from that previously described in that, as seen in FIGURES 15 and 15A, it is in reality a prolongation of the crossover conveyor 90 that delivers the product from the immersion unit into the postcool unit 20a.

The postcool unit 20a has a double walled frame or shell indicated at 120 and carries a rotary turntable T. The turntable includes a plurality of baskets 122 (see also FIG. 16) for receiving the product P for the postcooling operation. As seen in FIGURES 15 and 15A, an inlet chute 124 is provided in the postcool unit which, as seen in FIGURE 15A, is shrouded at 126 to seal off the tempering unit 16a from the atmosphere. The cold gas inlet 32a (FIG. 15) has connected therein a blower 34a driven by a motor 35a for conducting the cold gas evolved from the immersion unit 14 into the postcool unit 20a. A shutoff damper 128 and a control 130 therefor are provided in the cold gas inlet conduit 32a, in order to interrupt the delivery of cold gas to the postcool unit during the indexing of its turntable T.

A cold gas return 36a is provided to conduct gas from the gas outlet of the postcool unit 20a into the precool unit 12 as in the previously described form of the invention. The return conduit 36a includes a damper 38 and control 38a therefor to balance the pressures between the immersion and precool units as previously described. The postcool unit 20a includes a discharge chute 24a from which the postcooled product P falls onto a take-away conveyor 25 as before.

As seen in FIGURE 15, an indexing mechanism 132 is provided for rotating the table through equal increments during the semi-continuous postcool operation. This is a pneumatically operated table, the details of which form no part of the invention. The table drive illustrated is a Bellows rotary feed table drive manufactured by the Bellows-Valvaire Corporation, Akron, Ohio.

Referring to FIGURE 16, a pair of spaced lower plates at 138, forming part of the shell or frame 120 are illustrated, which plates are connected to a pair of spaced cylindrical side plates 140. Similarly a pair of spaced upper plates 142 complete the basic shell, there being insulation material 144 between the plates just described. The postcool unit 20a is mounted on legs 146 which can be made to support the postcool unit at the correct position relative to the cross conveyor 90 for receiving material from the immersion unit 14, as seen in FIGURE 15A.

Means are provided to support and seal the baskets 122 forming part of the turntable T for providing a tortuous gas chamber through the product between the gas inlet conduit 32a and the gas return conduit 36a (FIGS. 15 and 23). For this purpose a lower ring 150 is provided (FIGS. 16, 18 and 20) which is a composite member made up of an outer annular sealing member 152 (FIG. 16) in the form of an angle member, and an inner annular member 154 of similar construction. Welded between the ring members 152 to 154 at an angular spacing corresponding to the angular dimension of the baskets 122 of the turntable T are spoke-like sealing plates 156. Angularly spaced bottom webs 158 are welded between rings 152, 154 in vertical alignment with the sealing webs 156. The ring 150 is mounted on a radial spoke member 160 in the form of angles which are welded to the plates 158 and to rings 152, 154. A central sleeve 162 is fixed in the frame or shell 120 of the postcool unit by welding or attachment to the lower plates 138 previously described, as best seen in FIG. 16.

A series of cover plates 164 form the lower boundaries of gas passages between the baskets of the turntables. As seen in FIGURES 16 and 20, cover plates 164 are held by bridge clamp plates 166 and mounting studs 168. The bridge clamp plates 166 are positioned where the spoke members 160 coincide with the plates 158 that are fixed to the rings 152, 154. At the other plates 158 and 156, clamp plates 170 (FIG. 20) and studs 172 are provided to mount the lower cover plates 164. As also seen in FIGURE 20 baffles 174 are connected between the webs 156 and the cover plates 164 to provide end walls for the various gas chambers provided by the lower ring assembly 150. An upper fixed ring assembly 150a is also provided, and parts corresponding to those of the lowering assembly are designated with the same reference numbers followed by the letter a. The upper ring assembly 150a differs from the lower ring assembly 150 in that the upper spokes 160a are not joined to the sleeve 162 but are joined to a plate 176 as seen in FIGURE 16. The cover plates and baffles of the lower sealing ring 150 and the upper sealing ring 150a cooperate to form gas passages 180, 180a respectively, as will be explained in connection with the description of the operation of this form of the invention that follows.

Each of the baskets 122 on the turntable T is fitted with a wire mesh trap door 181 which is dropped to permit the frozen product to fall through the discharge chute 24a. In order to make this action possible, and as seen in FIGURES 21 and 22, a cam arrangement is provided. The outer ring 152 is provided with an offset section 182 (FIGURE 22) and the inner ring 154 is provided with an offset section 184, these sections being above the discharge chute 24a. A basket closing cam 186 is bolted to the outer ring 152 and an inner track extension 188 which is shorter than cam 186 is bolted to the inner ring 154. The cam 186 and track 188 cooperate with rollers on the hinged bottom 181 for each basket of the turntable, as will be described in the more detailed description of the turntable that follows.

As previously mentioned, the turntable T comprises a ring of product carrying baskets 122 mounted for rotation between the upper and lower rings 150 and 150a previously described. The turntable is intermittently rotated by the reciprocating turntable drive unit 132, shown in FIGURE 15. It is the function of the turntable to receive products that have been immersed in liquid nitrogen and deposited into the inlet chute 124, and to carry the products through a postcool zone countercurrent to a flow of cold nitrogen gas introduced through the gas inlet conduit 32a, and to bring the postcooled product over the discharge chute 24a and empty the product through that chute. The product so emptied, will have been postcooled and will have had enough heat removed so that upon equalization of the temperature of the product throughout, it will be at a uniform sub-freezing temperature, a temperature of 0° F. in the example being described.

Referring primarily to FIGS. 16, 19, 20 and 20A, the turntable T has an outer annular shell 192 and an inner annular shell 194. These shells being joined by radial walls 196 for forming the baskets 122. The radial walls 196 are formed with upper and lower sealing strip channels 198, which slidably receive plastic sealing strips 200 (FIG. 20A). The sealing strips 200 are urged outwardly by a series of coil springs 202, and are prevented from being forced clear of the turntable by retainer screws 204 which slide in slots 206 formed in the walls of channels 198. A similar sealing construction is provided in the form of upper and lower annular channels 208 formed on the inner and outer shells 192 and 194 of the turntable. Annular sealing strips 210 slide in channels 208, for engaging the angle members 152, 154 of the lower ring 150, and angle members 152a, 154a of the upper ring 150a. The annular sealing strips 208 may be segmented and are spring expelled and retained as are the radial sealing strips shown in FIGURE 20A.

In order to mount the baskets on the turntable for rotation, sets of cooperating mounting brackets 214 are mounted on the inner shell 194 and fastened to radial mounting spokes 216. The inner end of these spokes being welded to a collar 218. The collar 218 is keyed to a shaft 220 that rotates in the fixed sleeve 162 previously described, the collar being retained by a retainer collar 222. The lower end of the shaft 220 has keyed thereto a drive sprocket 224 which is retained by a retainer washer 226 on the shaft. A chain 228 seen in FIGURE 15, passes around the sprocket 224, and a sprocket 230 on the index unit 132.

As previously mentioned, each basket has a bottom in the form of a trap door indicated generally at 181, and best seen in FIGURES 16, 20 and 21. The door is formed of an open frame 234 with a trailing end thereof connected to a hinge assembly 236 (FIG. 20) on a wall 196 of each basket 122. A deflector shield 237 is mounted above each of the hinge assemblies 236. In order to support the trap door 181 of each basket except when the basket is over the discharge chute 24a, the frame 234 of each basket has an outside midroll 238, and an inside trailing roll 240 mounted thereon. The frame 234 of the trap door bottom 181 also mounts a wire mesh or screen member 242, for supporting the product while permitting postcooling gas to pass through the product.

As mentioned, in the form of the invention now being described, the turntable T is intermittently indexed from station to station. During delivery of the product to a basket opposite the inlet chute 24, and discharge of the postcooled product from the delivery chute 24a, the turntable is stationary, whereas the conveyor 90 that delivers product material from the immersion unit to the postcool unit 20a will be in operation. Also, while the turntable is stationary, gas will be pumped through the inlet line 32a by the blower 34a, through the product in the baskets of the turntable, and out the return line 36a. Thus, during this period the damper 128, FIGURE 15, will be opened under control of the control unit 130 provided for the damper. During the indexing operation, in order to conserve nitrogen gas, it is desirable to close the damper 128 in the gas conduit 32a, and to interrupt action of the cross conveyor 90 that delivers the product to the postcool unit 20a.

The operation just described is controlled by an index timer 248 (FIG. 15), the details of which are not critical to the present invention. This timer controls a valve assembly 250 for indexing the feed table drive 132, and controls a starter 252 for the motor 100a that operates the cross conveyor 90 that feeds the postcool unit 20a. The index timer also operates the control unit 130 for closing the damper 128 in the gas delivery conduit 32a, in the manner just described. As mentioned, details of these controls which can be supplied by the trade, are not critical to the invention, and hence are not described. It is only necessary that timing sequence explained above be carried out by the timer and its associated controls.

Each of the conveyors of the system, namely the precool conveyor 50, the cross conveyor 60 that feeds the immersion unit 14, the immersion conveyor 70, and the cross conveyor 90 that feeds the postcool unit 20a, are individually operated through variable speed transmissions, so that the process times for the individual steps of the cycle carried out by the system of the present invention can be adjusted to produce the desired results.

The diagram in FIGURE 23 clearly illustrates the respective paths of the product and the gas through the postcool unit 20a. As previously mentioned, the product is introduced into the postcool unit through the delivery chute 124, and during the introduction of the product, the turntable T is stationary, and a basket 122 of the turntable will be disposed beneath the chute 124. At the discharge station, the trailing rollers 240 will have dropped clear of their tracks, and the trap door 181 of the basket (see FIG. 21), will have fallen to discharge the product into the discharge 24a. The turntable will be stationary at this time, and cold nitrogen gas at −320° F. enters the conduit 32a and passes downwardly through the product in the basket beneath the gas inlet conduit. The gas will then be deflected through a chamber 180 formed by the lower ring 150, up through the next basket, and through a chamber 180a in the upper ring 150a. This path of the gas through the product continues, as seen in FIG. 23, until the gas leaves the postcool unit by means of the outlet conduit 36a, which directs the gas to the precool chamber 12. It is noted that the motion of the turntable, and hence of the product, is in a direction countercurrent to the direction of the flow of gas through the postcool unit, which provides the heat exchange advantages and efficiency previously referred to in connection with the desecription of the first embodiment of the invention.

Once the seal between the baskets and the radial webs or plates 156, 156a is broken, the gas inlet chamber 32a will be connected momentarily to the discharge chute 24a. Also, the breaking of the seals between the webs 156, 156a will interconnect the gas passages 180 in the lower ring 150 and passages 180a in the upper ring 150a, to partially bypass the product. However, during the indexing operation, the damper 128 in the gas inlet conduit 32a will have been closed in the manner previously described to conserve the cooling gas. If the economics of the operation is such that there is no need to conserve the cooling gas in this manner, the shut off damper 128 may be left open or dispensed with. During the indexing operation, the product merely accumulates on the cross conveyor 90 (FIG. 15) which serves as a buffer storage device, and also provides the tempering action, as previously described.

The baffles 174 and 174a can be reduced in number from the arrangement shown in FIG. 23 so that some baskets are in effect connected in parallel with one another. Also, is it not necessary that there be 12 baskets on the turntable T. The number of baskets and their physical geometry depending upon the rate of product flow, the nature of the product, and the rate of gas flow through the product. During each indexing operation, the mid-roller 238, which was previously resting on the cam 186 (FIG. 21), will ride up on the cam and will bring the trap door bottom 181 to its horizontal position, whereupon the mid-roller 238 supports the trap door bottom completely. When the basket is turned away from the trap door section, both the mid-roller 238 and the trailing rollers 240 will again ride on the annular tracks 152, 154 so that the bottom of the basket will be closed throughout the balance of the cycle.

Having completed a detailed description of the invention, it can be seen that in both embodiments a postcool unit is provided wherein the product and gas flow are counter-current. This facilitates heat transfer from the product to the gas, and optimizes the efficient utilization of the gas for the postcooling operation. Since a tempering step precedes the postcooling step, the heat transfer at the postcooling step is further optimized by providing a favorable temperature differential between the relatively warm surface of the entering product, and the somewhat warmer gas that is leaving the postcool unit. Thus the tempering step assists in making possible the efficient type of counterflow operation contemplated in the practice of the preferred embodiment of the present invention.

Having completed a detailed description of the invention so that those skilled in the art may practice same,

I claim:

1. The method of freezing cellular organic products comprising the steps of providing a bath of liquefied nitrogen gas, precooling the product in a bath of cold gas evolved from said bath to bring the product to an average temperature that is slightly above freezing, subjecting the precooled product to the bath of liquefied nitrogen gas to form a relatively thin frozen crust on the product, tempering the partially frozen product in a static bath of cold nitrogen gas that has evolved from the liquid bath to deepen the frozen crust of the product and raise its surface temperature, passing the tempered product countercurrent to a dynamic stream of cold nitrogen gas evolved from the liquid nitrogen bath to further deepen the frozen crust of the product sufficiently to cause the product to freeze solid upon removal thereof from the dynamic stream of gas, maintaining the pressure of the gas entering the precooling bath substantially equal to that of the gas evolved from the liquid bath.

2. The method of freezing cellular organic products comprising the steps of subjecting the precooled product to a bath of cold liquefied gas to form a relatively thin frozen crust on the product, trapping a body of gas evolved from said liquid bath, tempering the partially frozen product in said trapped body of gas to deepen the frozen crust of the product and raise its surface temperature, pumping gas evolved from said bath to establish a dynamic stream of cold gas, postcooling the tempered product in said dynamic stream of cold gas to further deepen the frozen crust of the product sufficiently to cause the product to freeze solid upon removal thereof from the dynamic stream of gas, establishing a precool chamber in communication with the gas evolved from said liquid bath, and directing said dynamic stream of gas leaving the postcooled product through the product in the precool chamber before the product enters the liquid bath to precool the product.

3. The method of claim 2, including the step of maintaining the pressure of the gas as directed into the product in the precool chamber substantially equal to the pressure of the gas evolved from the liquid bath.

4. The method of claim 2, wherein the stream of gas leaving the postcooled product is directed through the product in two passes.

5. Apparatus for freezing cellular organic products comprising a product bathing chamber containing a cryogenic liquefied gas and having product inlet and outlets, a precool chamber communicating with said product inlet, a product tempering chamber connected with said product outlet, means for maintaining a substantially static body of gas in said tempering chamber, a postcool chamber, a conduit and blower means for pumping gas evolved from the liquid in said product bathing chamber through said postcool chamber, a return conduit for conducting gas from said postcool chamber to said precool chamber, means for passing the product successively through said precool, bathing and tempering chambers, and means for passing the product through said postcool chamber countercurrent to the flow of gas through the latter.

6. The apparatus of claim 5, including means for controlling the gas pressure in said return conduit for maintaining the gas pressure in said bathing chamber and that at the entrance of said precool chamber substantially equal and slightly above atmospheric pressure.

7. Apparatus for freezing cellular organic products comprising a product bathing chamber containing a cryogenic liquefied gas and having product inlet and outlets, a precool chamber communicating with said product inlet, a product tempering chamber connected with said product outlet, means for maintaining a substantially static body of gas in said tempering chamber, a postcool chamber, a conduit and blower means for pumping gas evolved from the liquid in said product bathing chamber through said postcool chamber, means for admitting gas evolved from said liquid to said precool chamber, and means for passing the product successively through said precool, bathing and tempering and postcool chambers.

8. The method of freezing wet cellular organic products comprising the steps of subjecting the wet product to a bath of cold liquefied gas to form a relatively thin frozen crust on the product; tempering the partially frozen product in a static bath of cold gas that has evolved from the liquid of the bath, to deepen the frozen crust of the product and permit its surface temperature to rise, without substantially reducing the heat content of the product; thereafter causing relative motion of the parially frozen product and a dynamic stream of cold gas evolved from the liquid bath to further deepen the frozen crust of the product but without freezing the product solid, the crust having been further deepened sufficiently so that upon removal of the product from the dynamic stream of gas the further deepened frozen crust will abstract enough heat from the still unfrozen core of the product to freeze the core solid; and removing the product in the latter state from the gas.

9. The method of claim 8, wherein the relative motion of the partially frozen product and the dynamic stream of cold gas is countercurrent motion.

References Cited

UNITED STATES PATENTS

| | | | |
|---|---|---|---|
| 2,059,970 | 11/1936 | Robillard | 62—374 X |
| 2,254,420 | 9/1941 | Cleveland | 62—380 |
| 2,447,249 | 8/1948 | Hill | 62—65 X |
| 2,615,309 | 10/1952 | De More | 62—38 |
| 3,022,636 | 2/1962 | Morrison | 62—64 |
| 3,039,276 | 6/1962 | Morrison | 62—64 |
| 3,048,989 | 8/1962 | Morrison | 62—375 |
| 3,238,736 | 3/1966 | Macintosh | 62—63 |
| 3,250,630 | 5/1966 | Webster et al. | 99—193 |
| 3,294,553 | 12/1966 | Benson | 99—193 |

EDWARD J. MICHAEL, *Primary Examiner.*